United States Patent Office 2,759,144
Patented Aug. 14, 1956

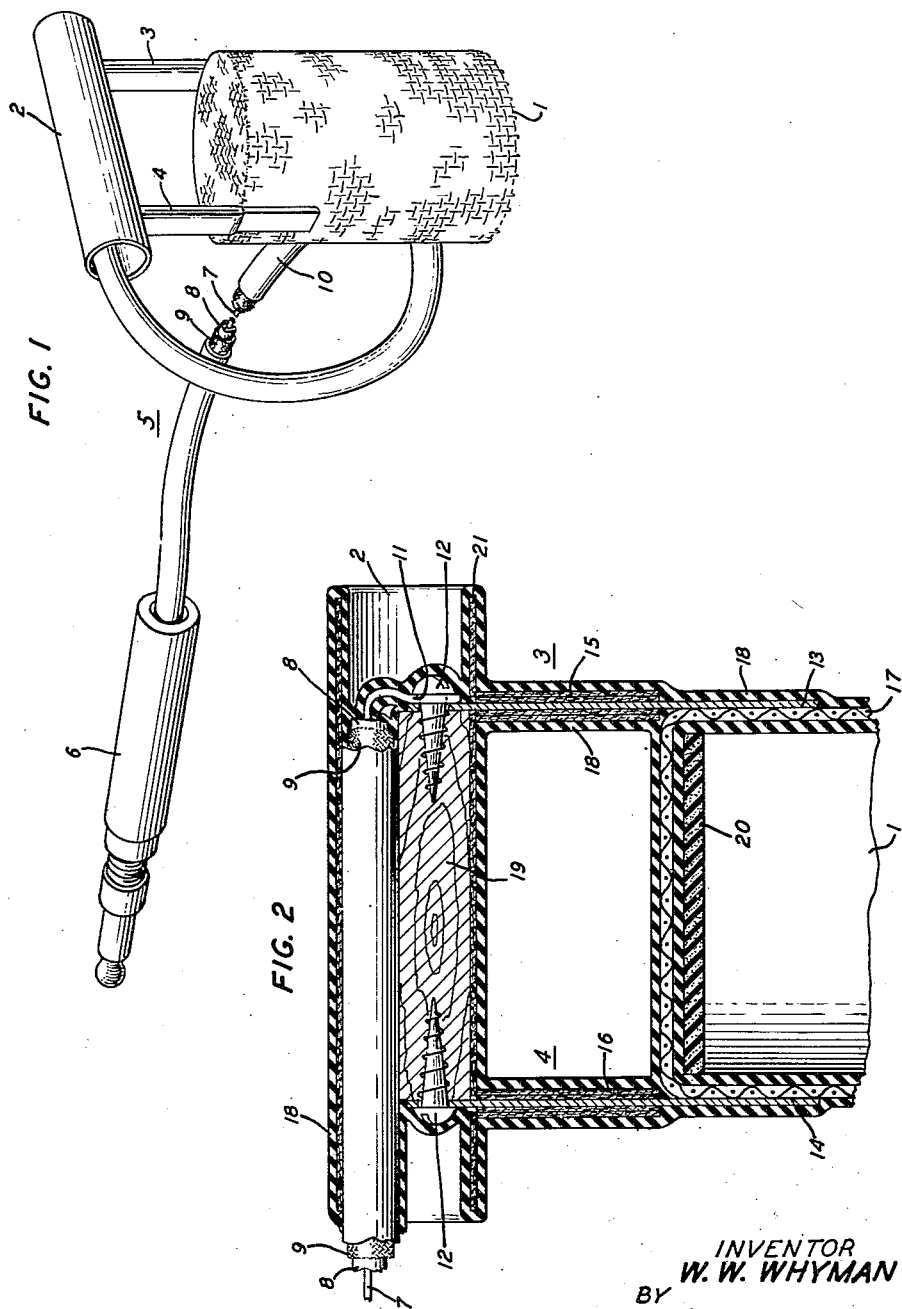

2,759,144

ELECTROSTATIC PROBE

Walter William Whyman, Batavia, N. Y., assignor to American Telephone and Telegraph Company, a corporation of New York Application August 26, 1953, Serial No. 376,653

3 Claims. (Cl. 324—20)

This invention relates to testing apparatus and more particularly to a convenient probe for electrostatically coupling a meter circuit to the electrode structure of a vacuum tube, while the tube is in operation.

In making routine tests of vacuum tubes in line amplifiers of carrier telephone systems, it has been found very convenient to be able to make quick tests of the carrier field surrounding certain of the vacuum tubes. These tests make it possible to detect such defects as improperly seated vacuum tubes which occasionally occur during maintenance operations, especially when replacing a tube, and other defects which cause the carrier level to lower to substandard conditions. Location and isolation of such defects by conventional means has always been very time consuming.

It is the object of this invention to provide a simple, convenient probe structure for coupling a vacuum tube to test apparatus for rapid checks of the operation of a vacuum tube and of the amplifier which contains it.

The foregoing object is attained by this invention which provides a hollow conductor of suitable dimensions for placing over a vacuum tube and a cable for connection between the hollow conductor and a test set.

The invention may be better understood by referring to the accompanying drawings in which:

Fig. 1 discloses an assembly view of the apparatus in a preferred form; and

Fig. 2 discloses a cross section of the probe structure.

In Fig. 1 the probe structure is shown as comprising a hollow conductor 1 preferably shaped in the form of a cylinder and constructed of a screen or mesh wire material. While solid material can be used, the screen wire provides ample coupling area and has some advantages over solid material in that it is substantially lighter in weight and is less rigid. It is, therefore, less likely to damage a vacuum tube if the tube is inadvertently struck while making tests. The upper portion of this probe structure is attached to an insulated handle 2 by means of struts 3 and 4. A suitable cable 5 connects a conventional plug 6 to the cylindrical probe 1 by connection to strut 3 inside of the handle 2.

The cable 5 is perferably shielded and comprises an inner conductor 7, an insulating coating 8 surrounding conductor 7, a braided conductor 9 surrounding the insulation 8 and an outer insulating coating 10.

The lower end of the cylindrical probe 1 is left open and its inside diameter and depth are of such dimensions that they will fit rather loosely around the envelope of a vacuum tube while in service. It is preferable that the cable 5 be attached at right angles to the principal axis of the cylinder 1 so that when the probe is placed over a vacuum tube, horizontally mounted on an amplifier rack, the weight of the cable 5 will have the least tendency to dislodge the vacuum tube from its socket.

Further details of the structure of this probe may be noted by referring to Fig. 2. In this figure it will be noted that the cylindrical conductor 1 comprises a conductive screen 17 to which struts 3 and 4 have been attached. Struts 3 and 4 are substantially identical and comprise a pair of metal strips 13 and 14 which are soldered to the upper end of the wire mesh 17. If desired, additional insulating material 15 and 16 may be wrapped around the upper part of the strips 13 and 14 but a sufficient length should be left at the upper ends to extend through slots in a fiber tube 21. Holes are drilled near the upper ends of strips 13 and 14 to receive a pair of wood screws 12, 12. A spacer strip 19, which may be a strip of wood of square cross section, is inserted inside of the fiber tube 21 along with the inner end of cable 5 and it is preferable that the dimensions be such as to cause the spacer 19 and the cable to fit tightly within the fiber tube 21.

The two strips 13 and 14 are then inserted in the slots in the side of fiber tube 21, after which wood screws 12, 12 secure the upper ends to the spacer strip 19. One of the wood screws will include, under its head, the inner end 11 of conductor 7 so as to provide an electrical connection from the tip of the plug 6 to the cylinder 17 through the metal strip 13. The braided shield 9 of the cable 5 is left unconnected at the end nearest conductor 1 but the other end is connected to the sleeve of plug 6 to provide a convenient shield to reduce the effect of body capacity when handling the probe and to eliminate stray coupling to other circuits.

After completing the assembly, as just described, it may be completely surrounded with several coats 18 of a suitable insulating material, such as Insulex. This material may be applied, not only to both the inside and outside of the cylindrical probe structure 1 but also to the struts 3 and 4 and the handle 2 as shown in Fig. 2. In order to further reduce the possibility of damage to a vacuum tube through mechanical shock when applying the probe to a tube, the inner end of the cylindrical probe 1 is preferably lined by cementing a sponge rubber cushion 20 to its inside surface.

This probe structure may be used with most any kind of transmission measuring set or rectifier type vacuum tube voltmeter. For most carrier telephone testing, it has been found that the cable 5 may be as long as 20 feet and may be constructed of a standard 72-ohm coaxial transmission line. The probe is also of value for coupling tubes of a video amplifier to an oscilloscope for routine observations of the video signal.

Having thus described the invention, it is evident that various modifications may be made without departing from the scope of the invention. For example, the shield provided by the braided conductor 9 of cable 5 may be connected to an additional external shield surrounding part or all of the outer surface of the cylindrical probe 1. This extends the shield to a larger part of the probe and may be useful in some instances. However, for general maintenance work of present day carrier telephone equipment, this modification has been found unnecessary. Furthermore, while there is some preference for wire screen in the construction of the hollow conductor 1, it is obvious that solid sheet material may be substituted wherever it is found that the more rigid solid construction will cause no damage to the tubes with which it is to be used. Also, a single bent rod can replace struts 3 and 4. This results in a simpler and less expensive embodiment of the invention.

What is claimed is:

1. An electrostatic probe for testing a vacuum tube circuit comprising a hollow conductor of sufficient inside dimensions to receive a vacuum tube included in the circuit to be tested, a shielded conductor connected at one end to said hollow conductor, the other end of said shielded conductor being adapted for connection to a test circuit, a handle rigidly attached to said probe with its length substantially perpendicular to the principal axis of the hollow conductor, said shielded conductor being secured to and parallel with said handle.

2. An electrostatic probe for testing a vacuum tube circuit comprising a hollow conductor of sufficient inside dimensions to receive a vacuum tube included in the circuit to be tested, a shielded conductor connected at one end to said hollow conductor, the other end of said shielded conductor being adapted for connection to a test circuit, an insulated coating completely covering said hollow conductor, and a sponge rubber cushion cemented to the inside end of said hollow conductor to cushion the vacuum tube under test against mechanical shock.

3. An electrostatic probe for testing a vacuum tube circuit comprising a hollow conductor of sufficient inside dimensions to receive a vacuum tube included in the circuit to be tested, a shielded conductor connected at one end to said hollow conductor, the other end of said shielded conductor being adapted for connection to a test circuit, an insulated coating completely covering said hollow conductor, and a cushion cemented to the inside end of said hollow conductor to protect the vacuum tube under test against mechanical shock.

References Cited in the file of this patent

UNITED STATES PATENTS

| | | |
|---|---|---|
| 1,904,059 | Kubach | Apr. 18, 1933 |
| 2,076,944 | Howe | Apr. 13, 1937 |
| 2,249,166 | Parker et al. | July 15, 1941 |
| 2,530,111 | Yeater | Nov. 14, 1950 |
| 2,601,649 | Wadman | June 24, 1952 |